United States Patent
Mizoguchi

(10) Patent No.: US 11,548,492 B2
(45) Date of Patent: Jan. 10, 2023

(54) VEHICLE TRAVELING CONTROL APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 246 days.

(21) Appl. No.: 16/935,919

(22) Filed: Jul. 22, 2020

(65) Prior Publication Data

US 2021/0094529 A1  Apr. 1, 2021

(30) Foreign Application Priority Data

Sep. 26, 2019  (JP) .............................. JP2019-175997

(51) Int. Cl.
*B60W 10/04* (2006.01)
*G05D 1/00* (2006.01)
*B60W 10/20* (2006.01)

(52) U.S. Cl.
CPC ............ *B60W 10/04* (2013.01); *B60W 10/20* (2013.01); *G05D 1/0061* (2013.01); *G05D 1/0088* (2013.01); *B60W 2710/20* (2013.01)

(58) Field of Classification Search
CPC .. B60W 10/04; B60W 10/20; B60W 2710/20; B60W 2520/10; B60W 60/0057; B60W 60/0053; B60W 2540/10; B60W 2540/18; B60W 2720/106; G05D 1/0061; G05D 1/0088

USPC .......................................................... 701/41
See application file for complete search history.

(56) References Cited

U.S. PATENT DOCUMENTS

| | | | | |
|---|---|---|---|---|
| 2003/0216854 | A1* | 11/2003 | Katakura ........... | B60K 31/0058 701/110 |
| 2016/0207536 | A1* | 7/2016 | Yamaoka .............. | B60W 50/10 |
| 2017/0349160 | A1* | 12/2017 | Kato .................... | B60W 10/18 |
| 2019/0152491 | A1* | 5/2019 | Arai ..................... | B60W 10/04 |
| 2019/0382015 | A1* | 12/2019 | Niu ...................... | B60W 10/04 |
| 2020/0110422 | A1* | 4/2020 | Takamatsu ......... | G01C 21/3819 |

(Continued)

FOREIGN PATENT DOCUMENTS

JP  2019-093924 A  6/2019

*Primary Examiner* — Jonathan M Dager
*Assistant Examiner* — Jean W Charleston
(74) *Attorney, Agent, or Firm* — McDermott Will & Emery LLP

(57) ABSTRACT

A vehicle traveling control apparatus includes a detector that detects an accelerator operation amount by a driver, a determiner that determines, based on a driving condition, whether a driving mode is currently a first mode in which a vehicle is caused to travel autonomously along a target travel path or a second mode in which the driver performs driving operation, a calculator that calculates a continuation time of the first mode when the driving mode is the first mode, a first setting unit that variably sets a characteristic of a target acceleration for the detected accelerator operation amount based on the calculated continuation time, and a second setting unit that, when the driving mode has transitioned from the first mode to the second mode, sets the target acceleration for the detected accelerator operation amount by referring to the set characteristic of the target acceleration for the accelerator operation amount.

10 Claims, 6 Drawing Sheets

(56) References Cited

U.S. PATENT DOCUMENTS

2020/0114911 A1* 4/2020 Mitsuhashi ............ B60W 50/14
2020/0406921 A1* 12/2020 Hirano .................. B60W 30/12
2021/0146943 A1* 5/2021 Oniwa ................ B60W 50/085

* cited by examiner

VEHICLE TRAVELING CONTROL APPARATUS

CROSS-REFERENCE TO RELATED APPLICATIONS

The present application claims priority from Japanese Patent Application No. 2019-175997 filed on Sep. 26, 2019, the entire contents of which are hereby incorporated by reference.

BACKGROUND

The technology relates to a vehicle traveling control apparatus configured to suppress accelerating, in a case where a driving mode has transitioned from an automatic driving mode to a manual driving mode, until a driver regains a sense of accelerator operation.

Various driving assist techniques have been proposed for recent vehicles, to reduce burden on drivers and enable comfortable and safe driving. Some of such techniques have already been put into practical use. In such driving assist techniques, when an automatic driving mode is selected as a driving mode, if a driver sets a traveling route to a destination, a target travel path on which an own vehicle should advance is set along the traveling route up to a predetermined distance ahead of the own vehicle, and the own vehicle is caused to travel autonomously along the target travel path (navigation-linked route traveling). At that time, under the well-known Adaptive Cruise Control (ACC) and Active Lane Keep (ALK) control, the front, rear, left and right of an own vehicle position are constantly monitored.

In a state where the own vehicle travels in the automatic driving mode, the driver does not normally perform accelerator operation, steering wheel operation, and brake operation. However, in a case where conditions for automatic driving are not satisfied or the road is in a manual driving section, or in a case where the driver himself or herself intentionally performs steering wheel operation or brake operation, if the control unit makes a determination of override, the driving mode transitions from the automatic driving mode to the manual driving mode, and the driver takes over the driving operation.

During the traveling in the automatic driving mode, the driver falls into a desultory state. Therefore, even if the driver suddenly takes over the driving operation from such a desultory state, it would be difficult for the driver to instantly regain the sense (feeling) of the accelerator operation, which may sometimes result in a difficulty in smooth takeover of the driving mode to the manual driving mode.

In view of such circumstances, for example, Japanese Unexamined Patent Application Publication (JP-A) No. 2019-93924 discloses a technique of controlling a driving force of a vehicle so as to gradually shift from a driving force in an automatic driving mode to a driving force required by a driver in a manual driving mode, at a rate not to make an occupant feel a shock, when causing the driving mode to transition from the automatic driving mode to the manual driving mode, to thereby enable a completion of smooth transition of the driving mode.

SUMMARY

An aspect of the technology provides a vehicle traveling control apparatus including an accelerator operation amount detector, a driving mode determiner, an automatic driving continuation time calculator, an acceleration characteristic setting unit, and a target acceleration setting unit. The accelerator operation amount detector is configured to detect an accelerator operation amount by a driver. The driving mode determiner is configured to determine, on a basis of a driving condition, whether a driving mode is currently an automatic driving mode in which the vehicle is caused to travel autonomously along a target travel path or a manual driving mode in which the driver performs driving operation. The automatic driving continuation time calculator is configured to calculate a continuation time of the automatic driving mode, when the driving mode determiner determines that the driving mode is the automatic driving mode. The acceleration characteristic setting unit is configured to variably set a characteristic of a target acceleration for the accelerator operation amount detected by the accelerator operation amount detector, on a basis of the continuation time calculated by the automatic driving continuation time calculator. The target acceleration setting unit is configured to, when the driving mode determiner determines that the driving mode has transitioned from the automatic driving mode to the manual driving mode, set the target acceleration for the accelerator operation amount detected by the accelerator operation amount detector by referring to the set characteristic of the target acceleration for the accelerator operation amount.

An aspect of the technology provides a vehicle traveling control apparatus including an accelerator operation amount detector and circuitry. The accelerator operation amount detector is configured to detect an accelerator operation amount by a driver. The circuitry is configured to determine, on a basis of a driving condition, whether a driving mode is currently an automatic driving mode in which the vehicle is caused to travel autonomously along a target travel path or a manual driving mode in which the driver performs driving operation. The circuitry is configured to calculate a continuation time of the automatic driving mode when the driving mode is determined to be the automatic driving mode. The circuitry is configured to variably set a characteristic of a target acceleration for the accelerator operation amount, on a basis of the calculated continuation time. The circuitry is configured to set the target acceleration for the detected accelerator operation amount by referring to the set characteristic of the target acceleration for the accelerator operation amount when it is determined that the driving mode has transitioned from the automatic driving mode to the manual driving mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Figure 1:
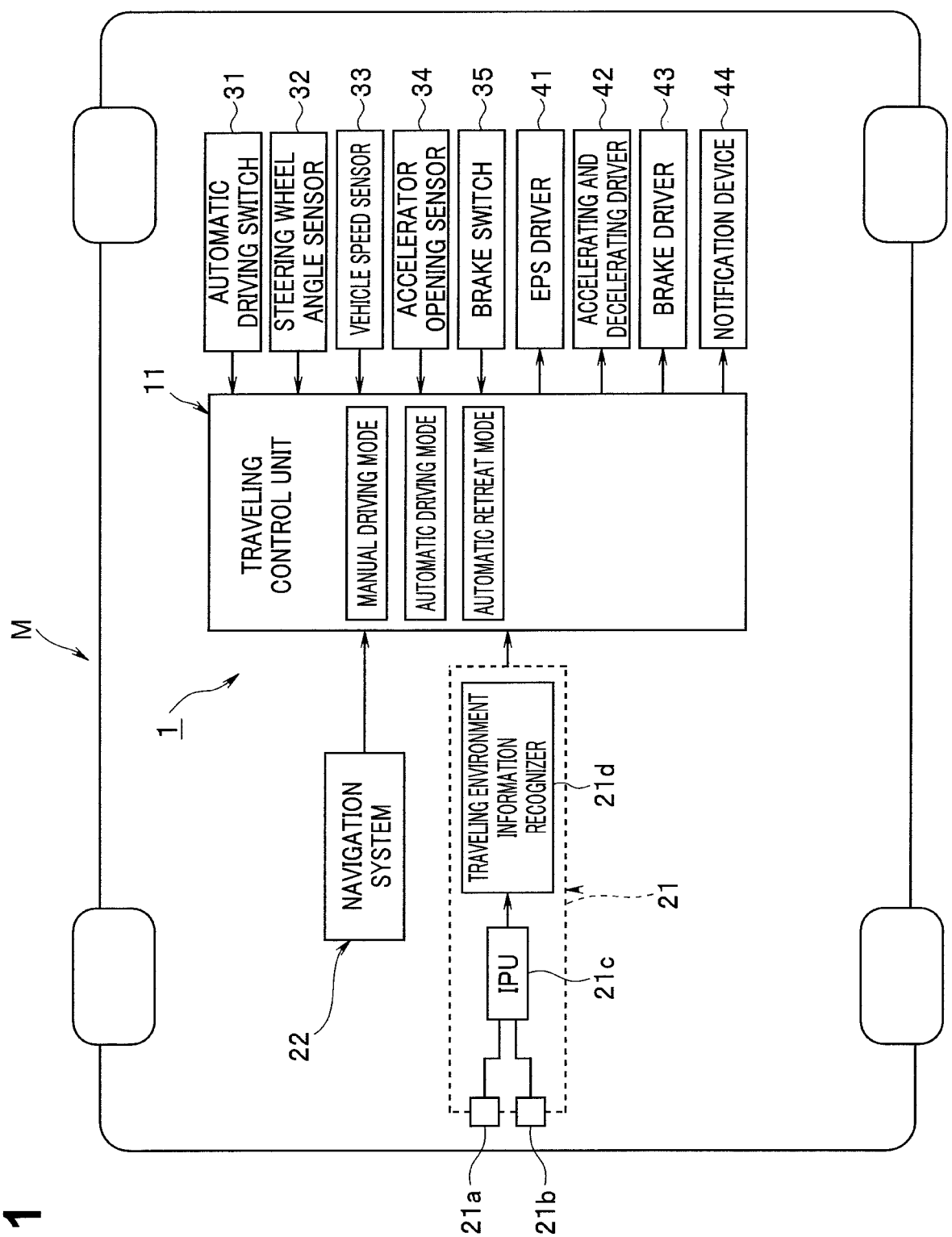
FIG. 1 is an overall configuration diagram of a traveling control apparatus.

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

During the traveling in the automatic driving mode, the driver does not usually perform accelerator operation. Therefore, when the driving mode transitions from the automatic driving mode to the manual driving mode, the driver's sense of accelerator operation gradually declines, as the traveling time in the automatic driving mode becomes longer.

However, the technique disclosed in the above-described publication causes the driving force to shift regardless of the elapsed time of the traveling in the automatic driving mode. Therefore, for example, if the driving mode transitions to the manual driving mode in a relatively short time after the start of the automatic driving mode, the driver's sense of accelerator operation has not declined yet. That is, if the shift of the driving force is controlled as disclosed in the above-described publication, the responsiveness of the accelerator is poor, which gives a sense of incongruity to the driver.

On the other hand, if the driving mode transitions to the manual driving mode after the traveling in the automatic driving mode has continued for a relatively long time, the driver's operational sense of the accelerator pedal declines significantly, which results in the possibility that the driver excessively depresses the accelerator pedal. In the above-described publication, if the depression amount of the accelerator pedal is equal to or larger than a predetermined amount, the depression amount is judged to be a driving force required by the driver, and the control unit performs control to cause the driving force to shift to the required driving force, which causes an inconvenience in which sudden accelerating unintended by the driver occurs and the sudden accelerating gives an unpleasant feeling to the driver.

In view of the above-described circumstances, it is desirable to provide a vehicle traveling control apparatus. The vehicle traveling control apparatus is capable of generating, when the driving mode transitions from the automatic driving mode to the manual driving mode, a driving force corresponding to an accelerator operation by a driver, even if the driving mode is caused to transition to the manual driving mode in a relatively short time after the automatic driving mode has started, to thereby prevent the driver from feeling a sense of incongruity. In addition, in a case where the driving mode has transitioned to the manual driving mode after the automatic driving mode continued for a relatively long time, even if the driver erroneously performs excessive accelerator operation due to a decline of the sense of accelerator operation, the vehicle traveling control apparatus prevents occurrence of sudden accelerating unintended by the driver, to thereby prevent the driver from having an unpleasant feeling.

An embodiment of the technology will be described below based on the drawings. A traveling control apparatus 1 illustrated in FIG. 1 is mounted on an own vehicle M. The traveling control apparatus 1 includes a traveling control unit 11 configured to set a driving mode of the own vehicle M in accordance with driving conditions. The traveling control unit 11 and a traveling environment information recognizer 21d of a camera unit 21, which will be described later, are each configured mainly by a well-known microcomputer including a CPU, a ROM, a RAM, a non-volatile memory and the like, and various programs executed by the CPU, various fixed data, and the like are stored in the ROM.

The driving mode set by the traveling control unit 11 includes three modes, i.e., a manual driving mode in which the driver performs driving operation, an automatic driving mode in which the own vehicle is caused to travel autonomously along a target travel path, and an automatic retreat mode. Note that the automatic retreat mode is a mode in which the own vehicle M is automatically guided to a safe place such as a road shoulder or the like when it is determined that continuation of the automatic driving mode is difficult during the traveling in the automatic driving mode. In such a case, the driving mode transitions from the automatic driving mode to the automatic retreat mode without transitioning to the manual driving mode. The situation where the continuation of the automatic driving mode is difficult includes a case where a large steering wheel angle Est is detected by a steering wheel angle sensor 32 to be described later, for example. Such a situation can be estimated to indicate that the driver is in a non-waking state such as fainting, unconsciousness, or the like, with the face placed on the steering wheel.

The automatic driving mode is a mode in which the own vehicle M is caused to travel autonomously (drive automatically) along the target travel path. Note that the automatic driving mode can be further subdivided into a steering holding mode in which the driver is required to hold the steering wheel and a hands-off mode in which the driver is not required to hold the steering wheel. In the present embodiment, these modes are generally referred to as the automatic driving mode.

In addition, the target travel path set by the traveling control unit 11 is linked with a traveling route set by a navigation system 22 to be described later. When the driver sets a destination, the navigation system 22 estimates a current position of the own vehicle M based on a positioning signal from a Global Navigation Satellite System (GNSS) satellite, to create a traveling route connecting the current position and the destination on a road map.

The traveling control unit sets, ahead of the own vehicle M, a target travel path (straight path, lane change to a branch lane, etc.) along the traveling route. When the driving mode is set to the automatic driving mode, the own vehicle M is caused to drive automatically (travel autonomously) along the target travel path. On the other hand, when a destination is not set in the navigation system 22, the traveling control unit 11 sets a target travel path such that the own vehicle M travels in the center of the currently traveling lane under the ACC and the ALK control.

To the input side of the traveling control unit 11, the camera unit 21 and the navigation system 22 are coupled as units that acquire parameters required in setting the driving mode. The camera unit 21 is fixed to an upper center of a front part in a cabin of the own vehicle M, and includes an in-vehicle camera (stereo camera) having a main camera 21*a* and a sub camera 21*b* that are disposed at symmetric positions across the center in the vehicle width direction, an image processing unit (IPU) 21*c*, and a traveling environment information recognizer 21*d*. The camera unit 21 performs predetermined image processing, in the IPU 21*c*, on the traveling environment image information ahead and around the own vehicle M obtained by the both cameras 21*a* and 21*b*, and transmits the image-processed traveling environment image information to the traveling environment information recognizer 21*d*.

The traveling environment information recognizer 21*d* obtains, based on the received traveling environment image information, a width (lane width) between lane markers that mark the left and right of a lane in which the own vehicle M travels, to calculate the center (lane center), and sets the lane center as the target travel path of the own vehicle M. Furthermore, based on the received traveling environment image information, the traveling environment information recognizer 21*d* recognizes a preceding vehicle traveling ahead of the own vehicle M, a fallen object on the road, and the like, by using a method such as pattern matching.

On the other hand, the navigation system 22 includes a high-precision road map database configured by a large-capacity storage medium such as HDD, and a high-precision road map information (dynamic map) is stored in the high-precision road map database. The high-precision road map information (hereinafter, just referred to as "road map information") includes lane data (lane width data, lane center position coordinate data, advancing azimuth angle data of the lane, a regulation speed, and the like) required for performing automatic driving. The lane data is stored for each of lanes on the road map at intervals of several meters.

The navigation system 22 receives a positioning signal from the GNSS satellite to acquire the position coordinates of the own vehicle M, map-matches the position coordinates on the road map information, and estimates the own vehicle position on the road map. In the environment such as traveling in a tunnel in which an effective positioning signal cannot be received from the positioning satellite, the navigation system 22 switches to the autonomous navigation, to estimate the own vehicle position on the road map based on a vehicle speed detected by a vehicle speed sensor, an angular speed detected by a gyro sensor, and a longitudinal acceleration detected by a longitudinal acceleration sensor.

Then, the navigation system 22 acquires the own vehicle position on the road map information and the road map information around the own vehicle position. When the driver sets a destination on the road map information, the navigation system 22 calculates and sets the traveling route from the own vehicle position (current position) to the destination based on the road map information. Note that the information acquired by the camera unit 21 and the information acquired by the navigation system 22 are read also when the traveling control unit 11 sets the target travel path along which the own vehicle M is caused to travel, the target travel path being linked to the traveling route.

Furthermore, sensors and switches that detect driving operations voluntarily performed by the driver are coupled to the input side of the traveling control unit 11, and drivers that control traveling of the own vehicle M in the automatic driving mode are coupled to the output side of the traveling control unit 11.

In one embodiment, the above-described sensors and switches include an automatic driving switch 31 configured to select ON and OFF of the automatic driving by an external operation by the driver, a steering wheel angle sensor 32 configured to detect a steering wheel angle Est at the time of automatic driving or at the time of manual driving, a vehicle speed sensor 33 configured to detect a vehicle speed (own vehicle speed) V of the own vehicle M, an accelerator opening sensor 34 configured to detect a depression amount (operation amount) of the accelerator pedal, and a brake switch 35 configured be turned on by detecting a depression amount of the brake pedal, and the like. In one embodiment, the steering wheel angle sensor 32 may serve as a "driving mode selector", the steering wheel angle sensor 32 may serve as a "steering wheel angle detector", the vehicle speed sensor may serve as a "vehicle speed detector", the accelerator opening sensor 34 may serve as an "accelerator operation amount detector".

In addition, the drivers that control traveling of the own vehicle M include an EPS driver 41 configured to drive an electric power steering (EPS) motor, an accelerating and decelerating driver 42 configured to control an output of a driving source (engine, electric motor), a brake driver 43 configured to supply brake fluid pressure to a wheel cylinder of a brake caliper provided to each of the wheels and to activate the brake forcibly, and the like. Furthermore, a notification device 44 configured by a voice speaker and a monitor is coupled to the output side of the traveling control unit 11.

The traveling control unit 11 performs accelerating suppression control for allowing smooth takeover of the driving operation to the driver when causing the driving mode to transition from the automatic driving mode to the manual driving mode. In the accelerating suppression control, an accelerator-acceleration characteristic and an accelerator operation speed threshold $\omega sl$ are constantly updated for each calculation cycle during the execution of the automatic driving mode. When the driving mode transitions to the manual driving mode, a target acceleration $\alpha t$ is set based on an accelerator opening $\theta ac$, the accelerator-acceleration characteristic, and the accelerator operation speed threshold $\omega sl$. Here, the accelerator-acceleration characteristic is used for limiting the target acceleration $\alpha t$ corresponding to the accelerator opening $\theta ac$, in accordance with the continuation time of the traveling in the automatic driving mode. In addition, the accelerator operation speed threshold $\omega sl$ is used for determining an accelerator operation speed $\omega ac$ to be described later.

Figure 2:
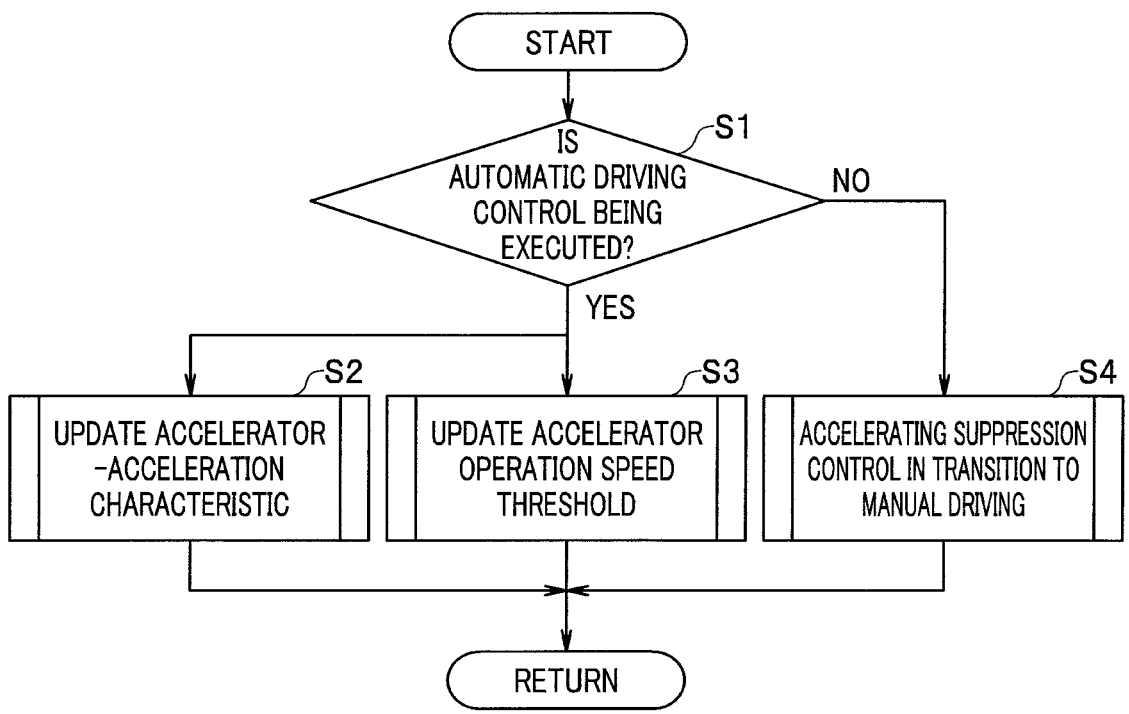
FIG. 2 is a flowchart illustrating an accelerating suppression control routine.

The accelerating suppression control executed by the traveling control unit 11 is executed, for example, according to the accelerating suppression control routine illustrated in FIG. 2.

In the routine, first in step S1, it is checked whether the automatic driving control is being executed, that is, checked whether the present driving mode is the automatic driving mode. In one embodiment, the processing in the step may correspond to a "driving mode determiner".

When the automatic driving switch 31 is turned on and the driving conditions for automatic driving (traveling in the automatic driving section, etc.) are satisfied, the driving mode is set to the automatic driving mode. On the other hand, in a case where the automatic driving switch 31 is turned off, or in a case where the automatic driving switch 31 is turned on but a determination of override is made due to depression of the accelerator pedal by the driver or steering wheel operation performed by the driver, the driving conditions for the automatic driving are not satisfied, and the driving mode is caused to transition to the manual driving mode.

In addition, when it is determined that the automatic driving control is being executed, the accelerator-acceleration characteristic update processing in step S2 and accelerator operation speed threshold update processing in step S3 are executed in parallel, and the procedure exits from the routine. On the other hand, when it is determined that the driving mode is set to the manual driving mode, the procedure branches to step S4 where accelerating suppression control processing in transition to manual driving is executed, and the procedure exits from the routine.

Figure 3:
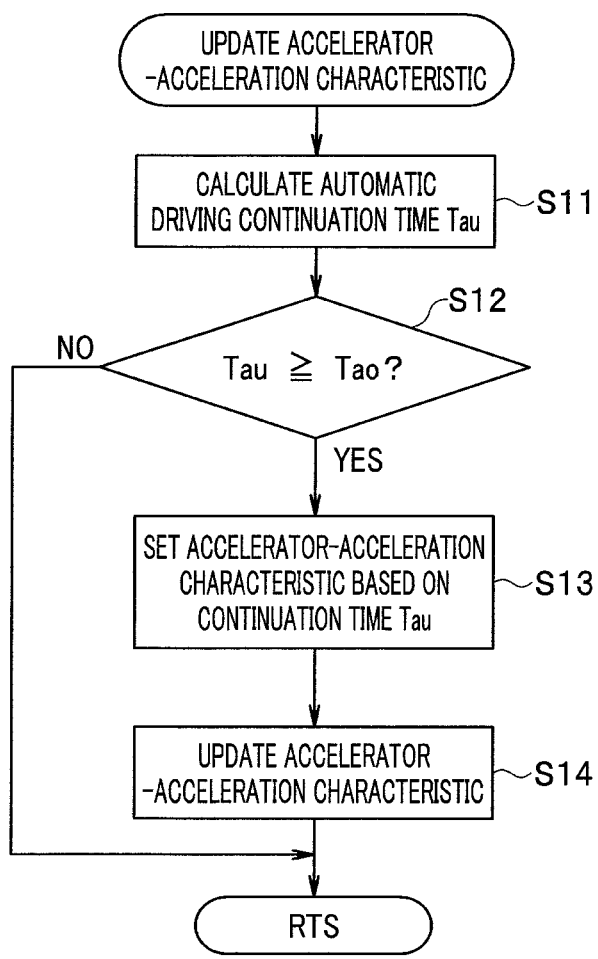
FIG. 3 is a flowchart illustrating an accelerator-acceleration characteristic update subroutine.

The processing in the step S2 is executed according to the accelerator-acceleration characteristic update subroutine illustrated in FIG. 3. In the subroutine, first in step S11, an automatic driving continuation time Tau is calculated. The automatic driving continuation time Tau is a continuation time after the driving mode during traveling has been set to the automatic driving mode. In one embodiment, the processing in the step may corresponds to an "automatic driving continuation time calculator".

Next, the procedure proceeds to step S12 where comparison is made between the automatic driving continuation time Tau and a continuation determination threshold Tao set in advance. For example, in a case where the driver causes the own vehicle to travel in the manual driving mode until the own vehicle reaches the automatic driving permitted section (expressway and the like), and causes the own vehicle to travel in the automatic driving mode when the own vehicle reaches the automatic driving permitted section, the sense (feeling) of the accelerator operation of the driver has not declined yet for a predetermined traveling time immediately after the transition to the automatic driving mode. Therefore, it is not necessary to limit the target acceleration αt relative to the accelerator operation amount (accelerator opening θac).

In the case of Tau<Tao, the procedure exits from the routine. On the other hand, in the case of Tau≥Tao, it is determined that the continuation time is relatively long and the sense of accelerator operation declines, and the procedure proceeds to step S13. Thus, the continuation determination threshold Tao is a value for determining whether there is an indication of a decline of the driver's sense of accelerator operation. The continuation determination threshold Tao may be set for each driver considering the individual differences. Alternatively, the continuation determination threshold Tao may be set to a fixed value of 5 to 10 [min].

Figure 6:
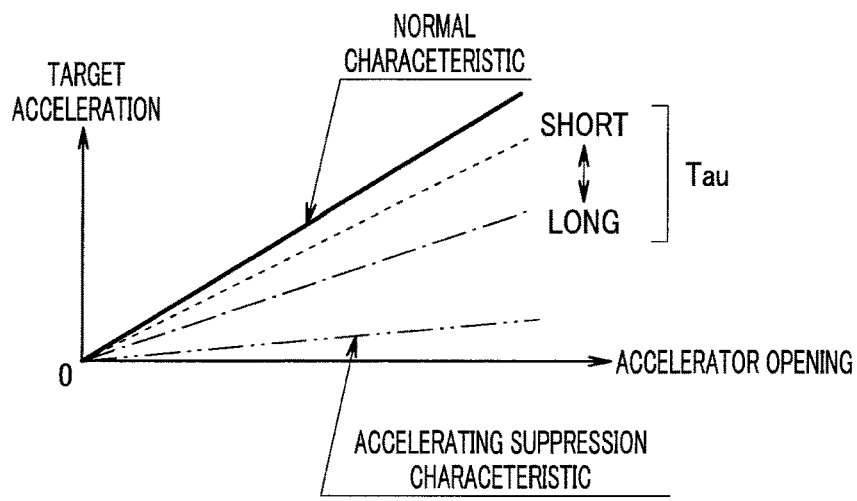
FIG. 6 is a conceptual diagram illustrating an accelerator-acceleration characteristic table.

After that, when the procedure proceeds to step S13, based on the automatic driving continuation time Tau, the characteristic of the target acceleration αt relative to the accelerator opening θac is set by referring to the accelerator-acceleration characteristic table illustrated in FIG. 6. In one embodiment, the processing in the step may corresponds to an "acceleration characteristic setting unit".

As illustrated in FIG. 6, there is a substantially proportional relation between the accelerator opening θac and the target acceleration αt. When it is supposed that the linear line illustrated by the thick line represents the normal characteristic in which the ratio of the accelerator opening to the target acceleration αt is 1:1, the inclination of the characteristic is set so as to become gradually small, as the automatic driving continuation time Tau becomes longer. Note that the degree of the inclination of the characteristic is set according to the level of decline of the driver's sense of accelerator operation over the elapse of time.

Note that the target acceleration may be obtained from the following linear equation: target acceleration=K·automatic driving continuation time. In this case, the coefficient (inclination) K is set according to the degree of decline of the sense of accelerator operation over the elapse of time.

Then, the procedure proceeds to step S14 where the accelerator-acceleration characteristic stored in a memory is updated with the accelerator-acceleration characteristic set this time, and the procedure exits from the routine. As a result, the longer the automatic driving continuation time Tau, the smaller (the lower) the inclination of the target acceleration αt relative to the accelerator opening θac. Therefore, the limit rate of the target acceleration αt relative to the accelerator opening θac gradually becomes larger. Note that the inclination of the characteristic becomes constant when the automatic driving continuation time Tau has passed a predetermined time (30 to 60 [min], for example).

Figure 4:
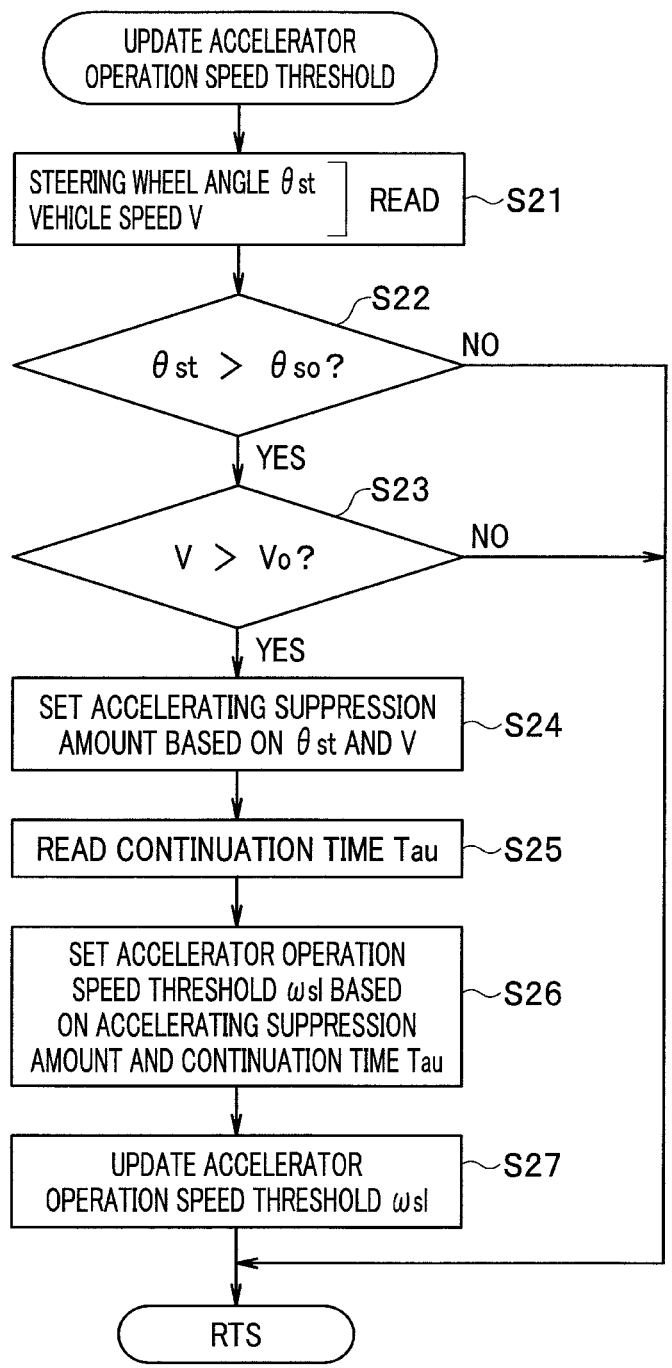
FIG. 4 is a flowchart illustrating an accelerator operation speed threshold update subroutine.

In addition, the processing in the step S3 is executed according to the accelerator operation speed threshold update subroutine illustrated in FIG. 4. In the subroutine, first in step S21, a steering wheel angle θst [deg] detected by the steering wheel angle sensor 32 and a vehicle speed V [Km/h] detected by the vehicle speed sensor 33 are read. Next, the procedure proceeds to step S22 where comparison is made between the steering wheel angle θst and a straight path determination threshold θso. Then, when it is determined that the own vehicle travels on a curved path where θst>θso, the procedure proceeds to step S23. On the other hand, when it is determined that the own vehicle travels on a substantially straight path where θst≤θso, the procedure exits from the routine.

When the procedure proceeds to step S23, comparison is made between the vehicle speed V and a low speed determination threshold Vo. When it is determined that the own vehicle travels at an intermediate high speed of V>Vo, the procedure proceeds to step S24. When it is determined that the own vehicle travels at a low speed of V≤Vo, the procedure exits from the routine.

That is, in a case where the own vehicle M travels on the straight path (θst≤θso) or travels at a low speed (V≤Vo) in the automatic driving mode, even if the driving mode is taken over to the manual driving mode and the accelerator pedal is depressed relatively deeply during the traveling on the straight path, the possibility that the own vehicle M deviates the lane is low. On the other hand, even if the driving mode is taken over to the manual driving mode during the traveling at a low speed, the driver is not likely to deeply depress the accelerator pedal. In such situations, limiting the accelerator operation amount might have an opposite effect that the driver feels a sense of incongruity. Therefore, the procedure exits from the routine without limiting the accelerator operation amount.

Figure 7:
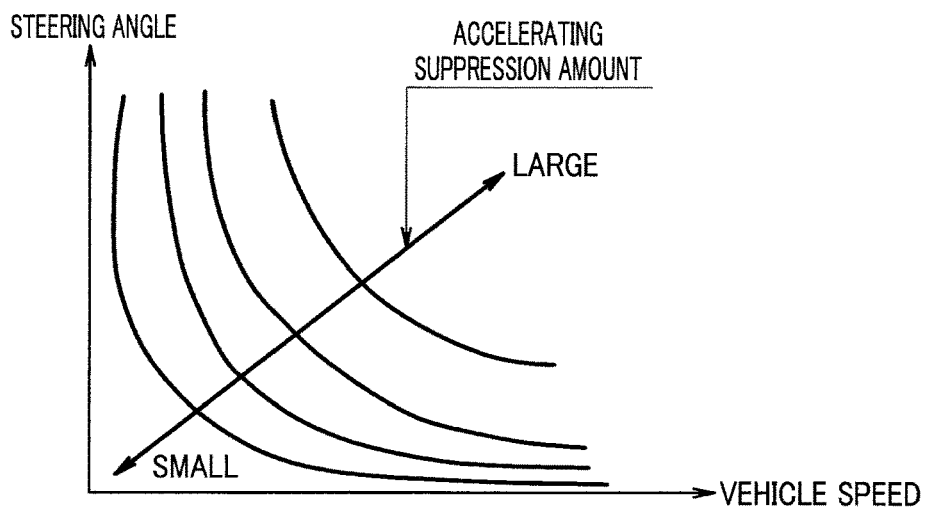
FIG. 7 is a conceptual diagram illustrating an accelerating suppression amount setting map.

After that, when the procedure proceeds to step S24, based on the steering wheel angle θst and the vehicle speed V, the accelerating suppression amount is set by referring to the accelerating suppression amount setting map illustrated in FIG. 7. In one embodiment, the processing in the step may correspond to an "accelerating suppression amount setting unit".

As illustrated in FIG. 7, the accelerating suppression amount is set such that the rate of suppressing the acceleration (accelerating suppression amount) becomes larger, as the steering wheel angle θst becomes larger and the vehicle speed V becomes higher. That is, in a case where the driving mode transitions to the manual driving mode during the traveling at a high speed on a curved path on which the steering wheel angle θst is relatively large, the accelerating suppression amount relative to the depression amount (accelerator opening θac) of the accelerator pedal by the driver is increased, to thereby be capable of preventing lane departure due to unnecessary accelerating.

Figure 8:
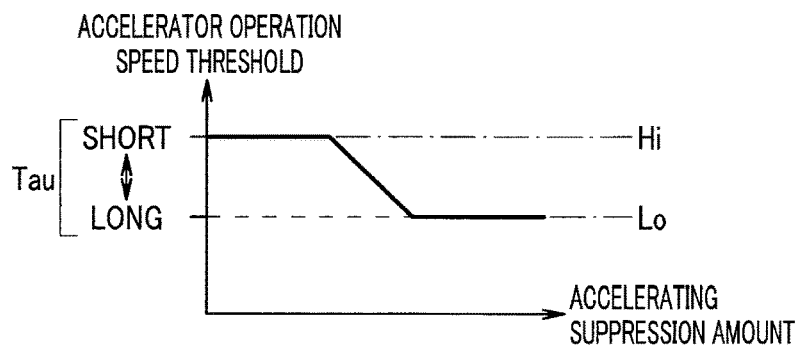
FIG. 8 is a conceptual diagram illustrating an accelerator operation speed threshold setting map.

Next, the procedure proceeds to step S25 where the automatic driving continuation time Tau is read, and then the procedure proceeds to step S26 where the accelerator operation speed threshold $\omega sl$ [deg/sec] is set based on the accelerating suppression amount and the automatic driving continuation time Tau, by referring to the accelerator operation speed threshold setting map illustrated in FIG. 8. In one embodiment, the processing in the step may correspond to an "accelerator operation speed threshold setting unit".

As illustrated in FIG. 8, the accelerator operation speed threshold $\omega sl$ is set to the upper limit value Hi until the accelerating suppression amount increases to reach a certain level, and the accelerator operation speed threshold $\omega sl$ is gradually decreased to be set to the lower limit value Lo. Therefore, when the accelerating suppression amount is small, the accelerator operation speed threshold $\omega sl$ is set to the upper limit value Hi. Therefore, the depression speed of the accelerator pedal by the driver is not significantly limited. On the other hand, when the accelerating suppression amount is large, the accelerator operation speed threshold $\omega sl$ is set to the lower limit value Lo. Therefore, even if the driver depresses the accelerator pedal rapidly, sudden accelerating unintended by the driver does not occur.

In addition, as the automatic driving continuation time Tau becomes longer, the upper limit value Hi of the accelerator operation speed threshold $\omega sl$ is gradually decreased to the lower limit value Lo. Therefore, even in a case where the accelerating suppression amount is small, if the automatic driving continuation time Tau is long, that is, as the sense of accelerator operation of the driver declines, the accelerator operation speed threshold $\omega sl$ is set to a low value.

Then, the procedure proceeds to step S27, the accelerator operation speed threshold $\omega sl$ stored in the memory is updated with the accelerator operation speed threshold $\omega sl$ (n) set this time, and the procedure exits from the routine. Here, the sign (n) indicates that the threshold newly set in the calculation this time.

Figure 5:
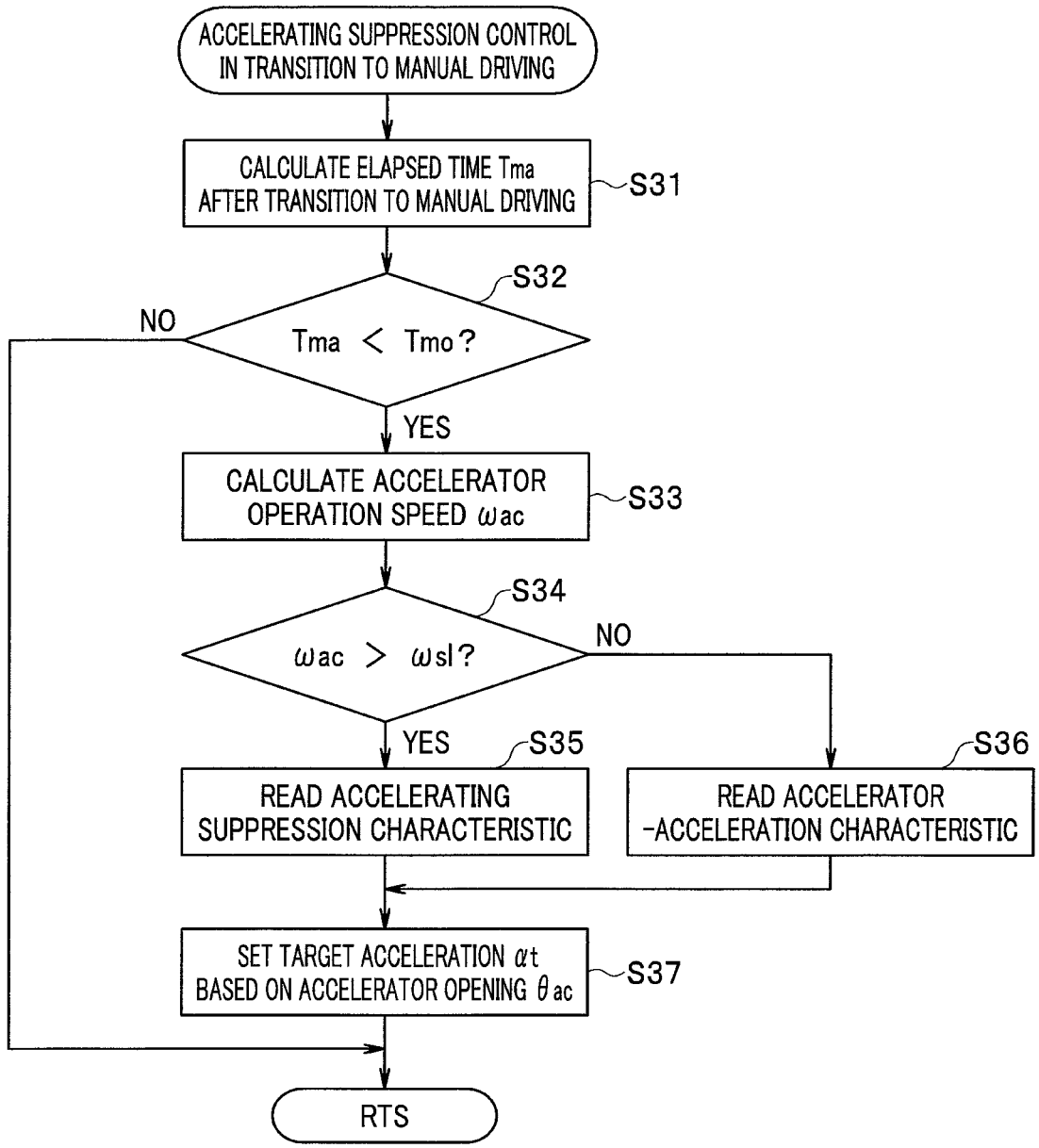
FIG. 5 is a flowchart illustrating a subroutine of an accelerating suppression control in transition to manual driving.

On the other hand, the accelerating suppression control processing in transition to manual driving in the step S4 is executed according to the subroutine of the accelerating suppression control in transition to manual driving illustrated in FIG. 5. In the subroutine, first in step S31, the elapsed time Tma after the driving mode has transitioned from the automatic driving mode to the manual driving mode is calculated, and in step S32, comparison is made between the elapsed time Tma and an initial suppression determination time Tmo as initial time.

The initial suppression determination time Tmo is a time period during which accelerating suppression is performed, in other word, a time period for determining that the sense of accelerator operation of the driver is regained. In addition, the initial suppression determination time Tmo is a fixed value determined in advance, for example, 1 to 2 [min].

If the initial suppression determination time Tmo is extremely short, the accelerating suppression is canceled before the sense of the accelerator operation of the driver has not been regained. On the other hand, if the initial suppression determination time Tmo is set to be longer than necessary, accelerating suppression is continued even after the sense of accelerator operation of the driver has been regained, which gives an unpleasant feeling to the driver. Therefore, the initial suppression determination time Tmo is set to an optimal time obtained in advance through an experiment, or the like.

In the case of Tma<Tmo, the procedure proceeds to step S33 to perform accelerating suppression control. In addition, in the case of Tma>Tmo, the accelerating suppression control need not to be performed, and the procedure exits from the routine. Therefore, in the case of Tma>Tmo, the driving mode is a normal manual driving mode, and the target acceleration αt is set for the depression amount of the accelerator pedal by the driver, based on the inclination of the normal characteristic illustrated in FIG. 6.

On the other hand, when the procedure proceeds to the step S33, the accelerator opening θac [deg] detected by the accelerator opening sensor 34 is time-differentiated, to calculate the accelerator operation speed $\omega ac$ [deg/sec]. Next, the procedure proceeds to step S34, and comparison is made between the accelerator operation speed $\omega ac$ and the latest accelerator operation speed threshold $\omega sl$ updated in the step S27 in FIG. 4. In one embodiment, the processing in the step may correspond to an "accelerator operation speed comparison unit".

In the case of $\omega ac>\omega sl$, it is determined that the driver rapidly depresses the accelerator pedal (accelerator operation speed $\omega ac$ is excessive), and the procedure proceeds to step S35. In the case of $\omega ac \leq \omega sl$, the procedure branches to step S36.

When the procedure proceeds to the step S35, the accelerating suppression characteristic is read, and the procedure proceeds to step S37. As illustrated in FIG. 6, the accelerating suppression characteristic is set in advance such that the inclination of the accelerator-acceleration characteristic is set to a value close to zero, and sudden accelerating due to the driver's rapid accelerator operation is suppressed. That is, even if the inclination of the accelerator-acceleration characteristic is set based on the automatic driving continuation time Tau, if the driver depresses the accelerator pedal deeply, a target acceleration corresponding to the depression amount of the accelerator pedal is set, which may result in rapid increase of the acceleration. Therefore, in such a case ($\omega ac>\omega sl$), the target acceleration corresponding to the accelerator opening is set based on the accelerating suppression characteristic, to thereby suppress the rapid increase of the acceleration.

Note that when the driver feels that the output of accelerator does not rise despite the rapid depression of the accelerator pedal, the driver releases (returns) the accelerator pedal once, and then depresses the accelerator pedal again. Then, the program (procedure) branches from the step S34 to the step S36. As a result, the state where the inclination of the accelerator-acceleration characteristic is close to zero does not continue.

In addition, when the procedure branches to step S36, the latest accelerator-acceleration characteristic updated in the step S14 in FIG. 3 is read, and the procedure proceeds to step S37.

When the procedure proceeds to step S37, based on the accelerator opening θac detected by the accelerator opening sensor 34, the target acceleration αt is set by referring to the above-described accelerating suppression characteristic or the accelerator-acceleration characteristic, and then the procedure exits from the routine. In one embodiment, the processing in the step S35 to S37 may correspond to a "target acceleration setting unit".

When the driving mode transitions from the automatic driving mode to the manual driving mode, the traveling control unit 11 calculates an output of a driving source (engine, electric motor) which corresponds to the target acceleration αt, and outputs a corresponding drive signal to the accelerating and decelerating driver 42, to thereby drive the driving source.

Thus, in the present embodiment, when the driving mode transitions from the automatic driving mode to the manual driving mode, the longer the automatic driving continuation time Tau in the automatic driving mode, the smaller the inclination of the target acceleration αt relative to the accelerator opening θac, which is set by the accelerator-acceleration characteristic. With such a configuration, even if the automatic driving continuation time Tau is long and the driver erroneously performs excessive accelerator operation due to a decline of the driver's sense of accelerator operation when the driving mode transitions to the manual driving mode, sudden accelerating unintended by the driver does not occur, which prevents the driver from having an unpleasant feeling.

In addition, in a case where the driving mode is caused to transition to the manual driving mode in a relatively short time (Tau<Tao) after the start of the automatic driving mode, the inclination of the target acceleration αt relative to the accelerator opening θac, which is set based on the accelerator-acceleration characteristic, is remained as that of the normal characteristic. Therefore, a driving force corresponding to the accelerator operation by the driver can be generated, to thereby be capable of preventing the driver from feeling a sense of incongruity.

Furthermore, when the driver rapidly depresses the accelerator pedal when the driving mode transitions from the automatic driving mode to the manual driving mode, the inclination of the target acceleration αt relative to the accelerator opening θac, which is set based on the accelerator-acceleration characteristic, is set to a value close to zero, to thereby be capable of preventing sudden accelerating due to rapid accelerator operation.

Note that the technology is not limited to the above-described embodiments. For example, in the subroutine of the accelerating suppression control in transition to manual driving as illustrated in FIG. 5, after the elapsed time Tma have passed the initial suppression determination time Tmo (Tma≥Tmo), the accelerator-acceleration characteristic for limiting the target acceleration αt may be gradually returned toward the inclination of the normal characteristic illustrated in FIG. 6

Each of the traveling control unit 11 and the navigation system 22 illustrated in FIG. 1 can be implemented by the aforementioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling control unit 11 including the manual driving mode, the automatic driving mode and the automatic retreat mode, and of the navigation system 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when the driving mode is determined to be the automatic driving mode, the continuation time of the automatic driving mode is calculated, and based on the continuation time, the characteristic of the target acceleration relative to the accelerator operation amount is variably set, and then, when it is determined that the driving mode has transitioned from the automatic driving mode to the manual driving mode, the target acceleration corresponding to the accelerator operation amount is set by referring to the characteristic of the target acceleration relative to the accelerator operation amount. Therefore, when the driving mode has transitioned from the automatic driving mode to the manual driving mode, if the continuation time of the automatic driving mode until the transition is relatively short, a driving force corresponding to the accelerator operation by the driver can be generated, to thereby prevent the driver from feeling a sense of incongruity.

In addition, in a case where the driving mode has transitioned to the manual driving mode after the automatic driving mode continued for a relatively long time, the target acceleration can be suppressed. Therefore, even if the driver erroneously performs excessive accelerator operation due to a decline of the sense of accelerator operation, sudden accelerating unintended by the driver does not occur, to thereby prevent the driver from having an unpleasant feeling.

The invention claimed is:

1. A vehicle traveling control apparatus to be installed in a vehicle, the vehicle traveling control apparatus comprising:
    a driving mode determiner configured to determine a current driving mode of the vehicle based on a driving condition of the vehicle, the current driving mode being i) an automatic driving mode in which the vehicle is caused to travel autonomously along a target travel path or ii) a manual driving mode in which a driver performs driving operation;
    an automatic driving continuation time calculator configured to, in response to determining that the current driving mode of the vehicle is the automatic driving mode, measure a period of time elapsed since the vehicle started traveling under the automatic driving mode;
    an accelerator operation amount detector configured to detect an accelerator operation amount by the driver;
    an acceleration characteristic setting unit configured to determine, based on the measured period of time elapsed since the vehicle started traveling under the automatic driving mode, a target acceleration to be set when the current driving mode of the vehicle transitions from the automatic driving mode to the manual driving mode; and
    a target acceleration setting unit configured to, in response to the driving mode determiner determining that the current driving mode of the vehicle has transitioned from the automatic driving mode to the manual driving mode, set the determined target acceleration for the accelerator operation amount.

2. The vehicle traveling control apparatus according to claim 1, wherein the target acceleration setting unit sets the target acceleration for the accelerator operation amount detected by the accelerator operation amount detector during an initial time set in advance, when the driving mode determiner determines that the driving mode has transitioned from the automatic driving mode to the manual driving mode.

3. The vehicle traveling control apparatus according to claim 1, wherein, based on the measured period of time elapsed since the vehicle started traveling under the automatic driving mode, the acceleration characteristic setting unit determines the target acceleration for the accelerator operation amount to be lower, as the measured period of time becomes longer.

4. The vehicle traveling control apparatus according to claim 1, further comprising
- a driving mode selector configured to select either one of the manual driving mode and the automatic driving mode by an external operation, wherein
- the driving condition to be read by the driving mode determiner is either one of the driving mode selected by the driving mode selector and the accelerator operation amount detected by the accelerator operation amount detector, and
- the driving mode determiner determines that the driving mode is the manual driving mode in either one of a case where the manual driving mode is selected by the driving mode selector and a case where depression of an accelerator pedal by the driver is detected on a basis of the accelerator operation amount detected by the accelerator operation amount detector.

5. The vehicle traveling control apparatus according to claim 1, further comprising:
- a steering wheel angle detector configured to detect a steering wheel angle;
- a vehicle speed detector configured to detect the vehicle speed;
- an accelerating suppression amount setting unit configured to set an accelerating suppression amount on a basis of the steering wheel angle detected by the steering wheel angle detector and the vehicle speed detected by the vehicle speed detector;
- an accelerator operation speed threshold setting unit configured to set an accelerator operation speed threshold, on a basis of the accelerating suppression amount set by the accelerating suppression amount setting unit, the accelerator operation speed threshold being for determining whether an accelerator operation speed obtained on the basis of the accelerator operation amount detected by the accelerator operation amount detector is excessive; and
- an accelerator operation speed comparison unit configured to compare the accelerator operation speed with the accelerator operation speed threshold set by the accelerator operation speed threshold setting unit, wherein
- the target acceleration setting unit is configured to refer to the characteristic of the target acceleration for the accelerator operation amount, when the accelerator operation speed comparison unit determines that the accelerator operation speed is equal to or lower than the accelerator operation speed threshold.

6. The vehicle traveling control apparatus according to claim 5, wherein the target acceleration setting unit determines the target acceleration to a value close to zero when the accelerator operation speed comparison unit determines that the accelerator operation speed exceeds the accelerator operation speed threshold.

7. The vehicle traveling control apparatus according to claim 5, wherein the accelerator operation speed threshold set by the accelerator operation speed threshold setting unit is set to a lower value, as the measured period of time becomes longer.

8. A vehicle traveling control apparatus to be installed in a vehicle, the vehicle traveling control apparatus comprising:
- an accelerator operation amount detector configured to detect an accelerator operation amount by a driver of the vehicle; and
- circuitry configured to
  - determine a current driving mode of the vehicle based on a driving condition of the vehicle, the current driving mode being i) an automatic driving mode in which the vehicle is caused to travel autonomously along a target travel path or ii) a manual driving mode in which the driver performs driving operation,
  - in response to determining that the current driving mode of the vehicle is the automatic driving mode, measure a period of time elapsed since the vehicle started traveling under the automatic driving mode;
  - determine, based on the measured period of time elapsed since the vehicle stated traveling under the automatic driving mode, a target acceleration to be set when the current driving mode of the vehicle transitions from the automatic driving mode to the manual driving mode; and
  - in response to determining that the current driving mode of the vehicle has transitioned from the automatic driving mode to the manual driving mode, set the determined target acceleration for the accelerator operation amount.

9. The vehicle traveling control apparatus according to claim 2, wherein, based on the measured period of time elapsed since the vehicle started traveling under the automatic driving mode, the acceleration characteristic setting unit sets the characteristic of the target acceleration for the accelerator operation amount to be lower, as the measured period of time becomes longer.

10. The vehicle traveling control apparatus according to claim 6, wherein the accelerator operation speed threshold set by the accelerator operation speed threshold setting unit is set to a lower value, as the measured period of time becomes longer.

* * * * *